United States Patent [19]

Aota

[11] Patent Number: 5,042,741
[45] Date of Patent: Aug. 27, 1991

[54] MECHANISM FOR PREVENTING ROTOR FROM ROTATING IN REVERSE DIRECTION

[75] Inventor: Etsuo Aota, Tokyo, Japan

[73] Assignee: Daiwa Seiko Co., Ltd., Tokyo, Japan

[21] Appl. No.: 426,606

[22] Filed: Oct. 25, 1989

[30] Foreign Application Priority Data

Nov. 15, 1988 [JP] Japan .................. 63-148675[U]

[51] Int. Cl.⁵ .............................................. A01K 89/00
[52] U.S. Cl. ................................. 242/234; 242/248;
242/224; 242/298; 242/247
[58] Field of Search ............... 242/247, 248, 234, 233,
242/232, 231; 74/577 R, 577 S

[56] References Cited

U.S. PATENT DOCUMENTS

| | | | |
|---|---|---|---|
| 2,705,113 | 3/1955 | Bonanno | 242/247 X |
| 2,862,679 | 12/1958 | Denison et al. | 242/247 |
| 2,964,257 | 12/1960 | Hull | 242/247 |
| 3,107,876 | 10/1963 | Ament | 242/247 X |
| 4,288,046 | 9/1981 | Morimoto et al. | 242/247 |
| 4,614,314 | 9/1986 | Ban | 242/248 |
| 4,729,527 | 3/1988 | Maruyama et al. | 242/247 |
| 4,824,045 | 4/1989 | Kawobe | 242/247 |
| 4,881,699 | 11/1989 | Emura | 242/248 |

FOREIGN PATENT DOCUMENTS 2247970  5/1975  France ............................ 242/247

Primary Examiner—Stuart S. Levy
Assistant Examiner—Joseph A. Rhoa
Attorney, Agent, or Firm—Michael L. Keller

[57] ABSTRACT

A reverse rotation preventing mechanism for a fishing spinning reel having a reel body, a rotor, and a main shaft, comprises a ratchet wheel mounted on the rotor within the forward recessed portion of the rotor, and a stop pawl selectively engaging with the ratchet wheel. The stop pawl is formed integrally with a shaft portion which passes through a wall of the reel body. The reverse rotation preventing mechanism also includes an operation member for controlling an engaging condition of the stop pawl with the ratchet wheel. The operation member is provided in the rear portion of the reel body.

6 Claims, 4 Drawing Sheets

MECHANISM FOR PREVENTING ROTOR FROM ROTATING IN REVERSE DIRECTION

BACKGROUND OF THE INVENTION

The present invention relates to an improvement in a reverse rotation preventing mechanism for a fishing reel.

A conventional reverse rotation preventing mechanism of this type has been disclosed in, for example Japanese Utility Model Examined Publication No. 63-64.

In the mechanism disclosed in that publication, a stop pawl is pivotally mounted on a rear face of a reel body in a recess formed in a front portion of the rotor. An operation cam member for operating one end of the stop pawl is adapted to project in the front portion of the rotor.

However, the prior art mechanism suffers from the following defects. In the prior art, the stop mechanism requires a large space due to the shape of the stop member and the location of the operation cam member. It is difficult to make the stop mechanism small in size. In addition, since the stop pawl is pivotally supported by a screw, the latter is likely to be loosened when the stop mechanism is repeatedly used for a long period of time. Further it is troublesome to assemble the stop mechanism into the reel.

SUMMARY OF THE INVENTION

Accordingly, an object of this invention is eliminate the above-described difficulties in a fishing spinning reel having a conventional reverse rotation preventing mechanism.

Another object of the invention is to provide a reverse rotation preventing mechanism having an operation cam member within the reel body, which is controlled by an operation member.

These and other objects are attained by providing a reverse rotation preventing mechanism for a fishing spinning reel having a reel body having a front portion and a rear portion, a rotor rotatable relative to said reel body in a reverse direction opposite to a forward direction which fishline is wound on said reel, said rotor including a forward recessed portion, and main shaft mounted in the reel body, comprising: a ratchet wheel for preventing the rotor from rotating in the reverse direction, the ratchet wheel rotating together with the rotor within the forward recessed portion of the rotor; stop pawl means for selectively engaging with the ratchet wheel, the stop pawl means being rotatably supported through a wall of the reel body; and operation means for controlling an engaging condition of the stop pawl, the operation means being provided in the rear portion of the reel body.

More specifically, according to the present invention, provides a stop pawl which engages with a ratchet wheel within the forward recessed portion of a rotor. The stop pawl provides integrally to a shaft portion and the shaft portion is supported through the wall of said reel body by a bearing means.

In the illustrated embodiment, the stop pawl is always biased by a spring member so as to engage with the ratchet wheel. In another illustrated embodiment, the stop pawl is separated apart from the ratchet wheel when the rotor rotates in a forward direction, that is, in a direction in which a fishline is wound on the reel.

The present invention will be better understood from the following detailed description when read in conjunction with the accompanying drawings, in which like parts are designated by like reference numerals or characters.

DETAILED OF THE PREFERRED EMBODIMENTS

The invention will now be described with reference to the accompanying drawings.

Figure 1:
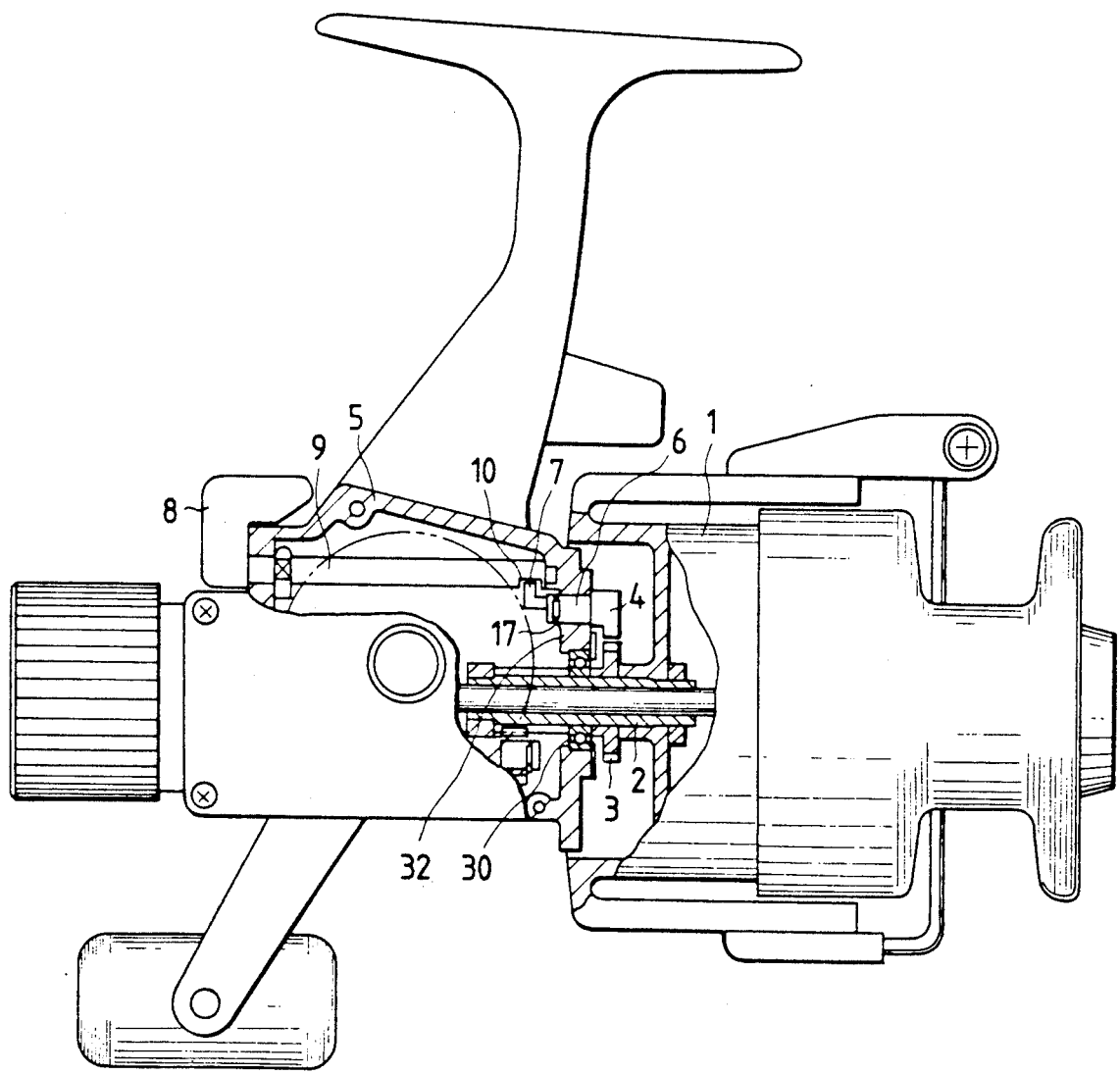
FIG. 1 is a partially fragmentary front view showing an embodiment of the invention, a fishing reel having a reverse rotation preventing mechanism according to a first embodiment.

As shown in FIG. 1, a hollow cylindrical shaft 2 is rotatably supported by a bearing member 30 in a front recessed portion of a rotor 1 of a spinning reel. A ratchet wheel 3 for preventing the rotor 1 from rotating in a reverse direction is mounted on the hollow cylindrical shaft 2. A stop pawl 4 which is freely engageable with the ratchet wheel 3 is integrally formed with a shaft portion 6. The shaft portion 6 is supported through the wall of a reel body 5 by a suitable bearing means 32. The stop pawl 4 is mounted on the reel body 5 and is supported by the bearing means 32 without using any screws.

The shaft portion 6 is integrally formed with an operation cam member 7 within the reel body 5. The operation cam member 7 arranged so that it may be controlled by a cam portion 10 of an operation member 9 having a knob pivotally supported to the reel body 5. In addition, the spring 11 always biases the stop pawl 4 so as to engage with the ratchet wheel 3.

Figure 2:
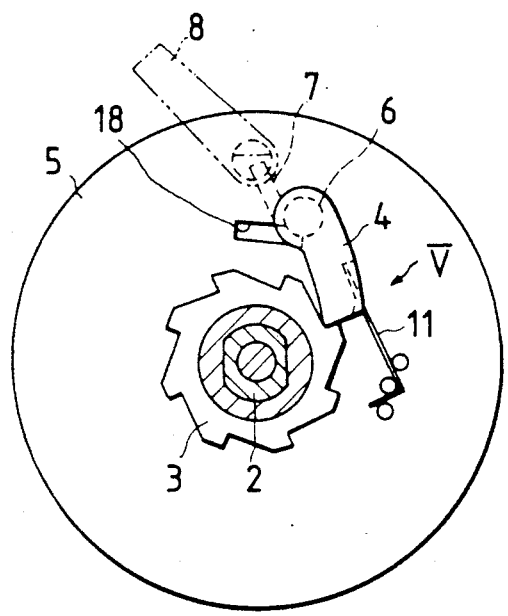
FIGS. 2 to 4 are side elevational views showing operating conditions of a stop pawl.
Figure 3:
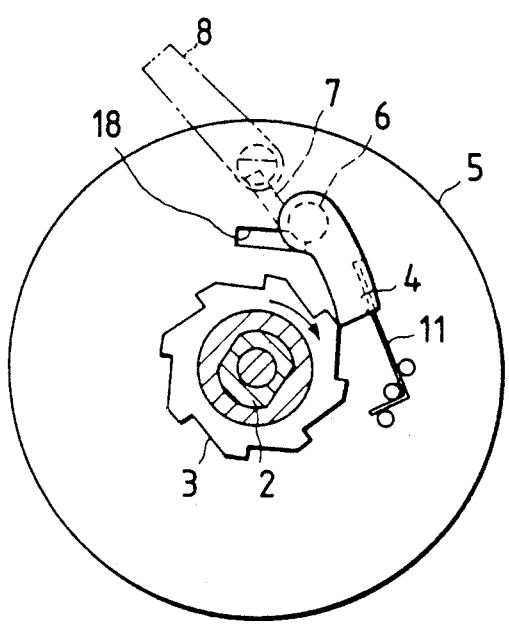
Figure 4:
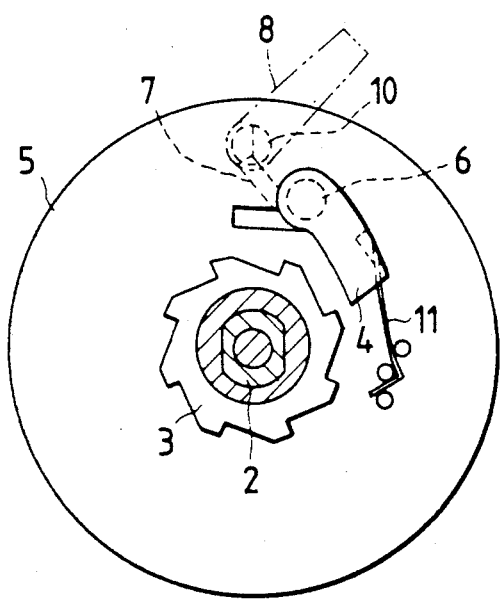
Figure 5:
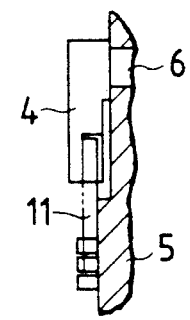
FIG. 5 is a partially sectional view, as viewed in the direction indicated by the arrow V in FIG. 2.
Figure 6:
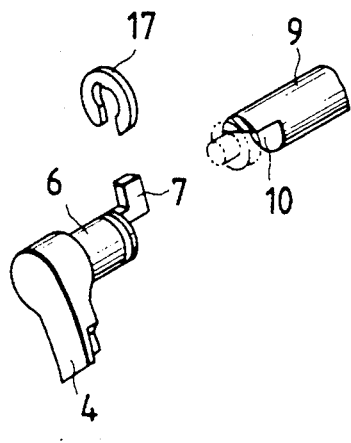
FIG. 6 is an exploded perspective view showing the stop pawl.

Therefore, when the stop pawl 4 is controlled to engage with the ratchet wheel 3 by the operation member 9, the rotor 1 is prevented from rotating in a reverse direction as shown in FIG. 2, so that the rotation of the rotor may be rotated in a forward direction, that is, in a direction in which a fishline is wound on the reel as shown in FIG. 3.

On the other hand, when the operation cam member 7 is controlled by the operation member 9 and the stopper pawl 4 is separated apart from the ratchet wheel, the rotor can rotate in either a forward direction or reverse direction.

Figure 7:
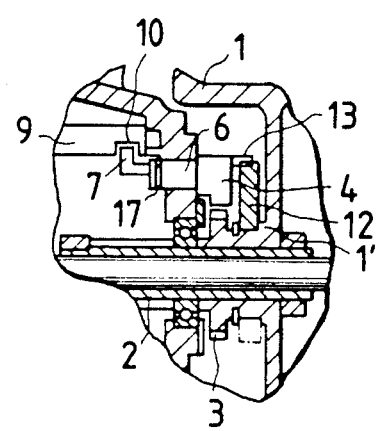
FIG. 7 is a partially sectional view showing a second embodiment of the invention.
Figure 9:
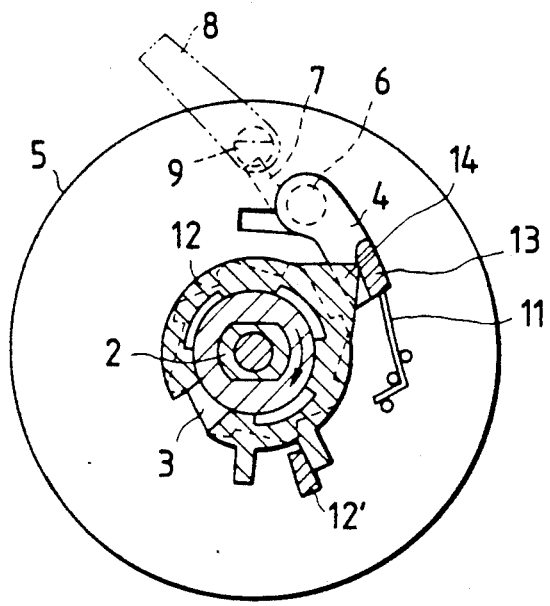
FIG. 9 is a partially sectional view showing a rotor rotating in a forward direction in accordance with the second embodiment.
Figure 8:
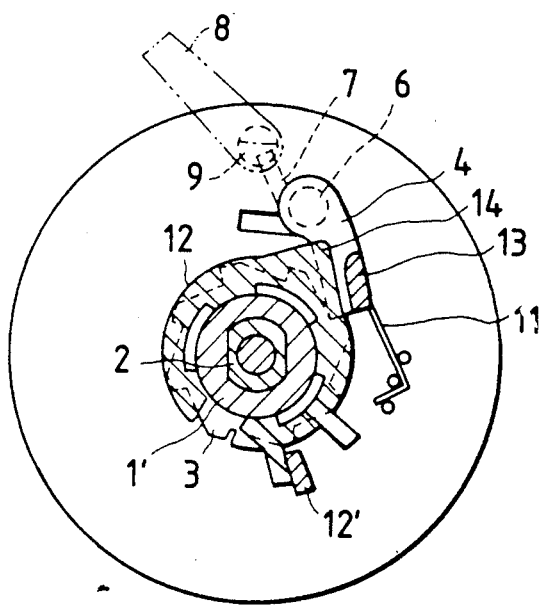
FIG. 8 is a partially sectional view showing a rotor, rotating in a reverse direction in accordance with the second embodiment.

FIGS. 7 to 9 illustrate a second embodiment of the present invention.

In this embodiment, when the fishline is wound on the rotor, the stop pawl 4 is always separated apart from the ratchet wheel 3 so that the rotor 1 may be rotated in a forward direction without any noises. An annular control member 12 is in frictional engagement with the outer circumferential portion of the hollow cylindrical portion 1' of the rotor 1 mounted on the hollow cylindrical shaft 2. The annular control member 12 may rotate through a predetermined angle by the stop member 12'. When the rotor 1 rotates in a forward direction, an engaging portion 13 of the stop pawl 4 engages a protrusion portion 14 of the annular control means 12 so that the stop pawl 4 is separated apart from the ratchet wheel 3.

Figure 10:
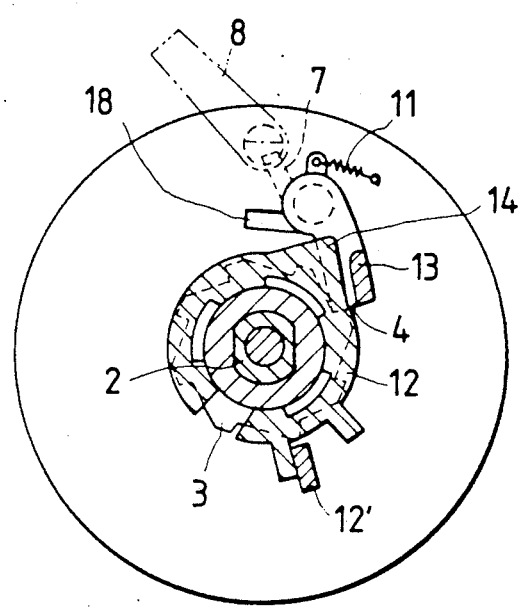
FIG. 10 is a side elevational view showing a third embodiment of the invention.

FIG. 10 illustrates a third embodiment of the present invention. In this embodiment, a coil spring 11 is used instead of the leaf spring 11 shown in the second embodiment. The other arrangement of the third embodiment is the same as that of the second embodiment.

Figure 12:
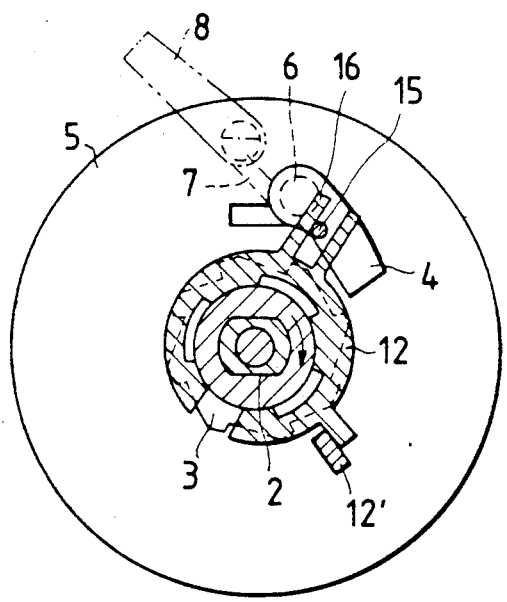
FIG. 12 is a side elevational view showing a fourth embodiment of the invention, in which rotor rotating in a forward direction.
Figure 11:
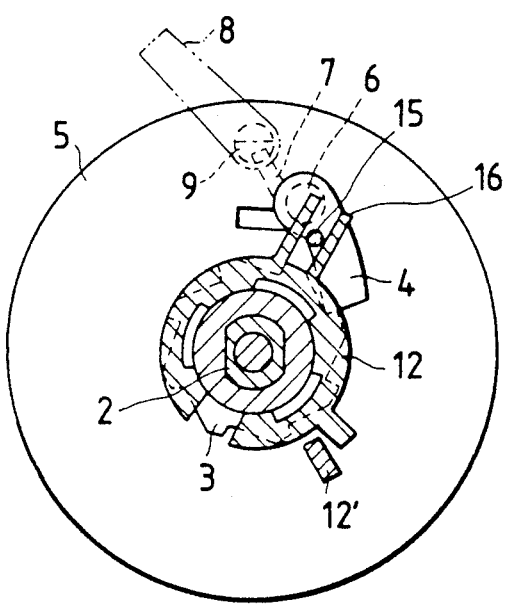
FIG. 11 is a side elevational view showing a fourth embodiment of the invention, in which a rotor rotates in a reverse direction.

FIGS. 11 and 12 show a fourth embodiment of the present invention, which modifies the second embodiment. In this embodiment, a bifurcated portion 16 which is engaged with a engaging protrusion portion 15 mounted on the stop pawl 4 is provided to the annular control member 12. Accordingly, when the rotor 1 rotates in a reverse direction, the stop pawl 4 engages the ratchet wheel 3, whereas, the rotor 1 rotate in a forward direction, the stop pawl 4 is always separated apart from the ratchet wheel, by means of the engaging protrusion portion 15.

Referenced number 17 denotes a washer of the stop pawl 4, and numeral 18 denotes an insertion bore through which the operation member 7 is inserted for holding the stop pawl 4 to the reel body 5, when this mechanism is assembled.

As described above, in the fishing spinning reel having a mechanism for preventing a rotor from rotating in a reverse direction, the stop pawl 4 which is engaged with the ratchet wheel 3 is integrally formed with the shaft portion 6 which is directly supported to the reel body 5 by the bearing means 32. Further, the operation cam member 7 of the stop pawl 4 which is controlled by the operation member 9 is located in the reel body 5.

Since the stop mechanism 4 can be miniaturized and it is possible to save a space needed for the operation member, the stop mechanism can be remarkably minimized, and be simplified in structure.

Further, the stop pawl is provided to the shaft without using any screws so that the stop pawl is never loosened even when it is used for a long time.

Having described a preferred embodiment of the present invention, it will be understood that variations and modifications thereof will become apparent to those skilled in the art, and the scope of the present invention is limited only by the appended claims.

What is claimed is:

1. A reverse rotation preventing mechanism for a fishing spinning reel having a reel body having a front portion and a rear portion, a rotor rotatable relative to said reel body, said rotor including a forward recessed portion, and a main shaft mounted in said reel body, comprising:

a ratchet wheel for preventing said rotor from rotating in a reverse direction opposite to a forward direction in which a fishline is wound on said reel, said ratchet wheel rotating together with said rotor within said forward recessed portion of said rotor;

stop pawl means for selectively engaging with said ratchet wheel, said stop pawl means being rotatably supported through a wall of said reel body on a first end of an integral shaft, said shaft including a cam portion at a second end of said shaft opposite said stop pawl means, said cam portion extending away from the axis of said integral shaft; and, operation means for controlling an engaging condition of said stop pawl means, said operation means being provided in said rear portion of said reel body and extending forwardly to engage and selectively urge against said cam portion so as to effect control of said stop pawl means.

2. The mechanism according to claim 1, further comprising:

a hollow cylindrical shaft rotatably mounted on said main shaft, said ratchet wheel being mounted on and rotating together with said hollow cylindrical shaft.

3. The mechanism according to claim 1, further comprising:

a spring means for biasing said stop pawl means to engage with said ratchet wheel.

4. The mechanism according to claim 1, further comprising:

an annular control means rotatably mounted on the rotor for separating said stop pawl means away from said ratchet wheel when said rotor rotates in the forward direction.

5. The mechanism according to claim 4, wherein said annular control means includes a protrusion portion and said stop pawl means includes an engaging portion, said protrusion portion being engageable with said engaging portion.

6. The mechanism according to claim 4, wherein said annular control means includes a bifurcated portion and said stop pawl means includes an engaging protrusion portion, said bifurcated portion being engageable with said engaging protrusion portion.

* * * * *